United States Patent
Kalm et al.

(10) Patent No.: US 6,253,909 B1
(45) Date of Patent: *Jul. 3, 2001

(54) MODULAR POWER ROLLER CONVEYOR

(75) Inventors: W. Scott Kalm, Carrolllton; Morteza Mortazi Langroodi, Arlington; Keith Corrigan, Mansfield, all of TX (US)

(73) Assignee: Siemens ElectroCom, L.P., Arlington, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/762,314

(22) Filed: Dec. 9, 1996

Related U.S. Application Data

(63) Continuation of application No. 08/331,063, filed on Oct. 28, 1994, now Pat. No. 5,582,286.

(51) Int. Cl.[7] .................................................. B65G 13/06
(52) U.S. Cl. ...................................................... 198/781.06
(58) Field of Search ..................... 198/781.06, 781.09, 198/781.1, 367, 860.3

(56) References Cited

U.S. PATENT DOCUMENTS

| | | | |
|---|---|---|---|
| 3,236,361 | * 2/1966 | Hackbarth et al. | ................. 198/367 |
| 3,429,417 | * 2/1969 | De Good et al. | ..................... 198/367 |
| 4,982,835 | * 1/1991 | Butler et al. | ........................ 198/860.3 |
| 5,060,785 | * 10/1991 | Garrity | ............................. 198/781.06 |
| 5,086,910 | * 2/1992 | Terpstra | ............................ 198/781.06 |
| 5,201,397 | * 4/1993 | Isaacs | .............................. 198/781.06 |
| 5,285,887 | * 2/1994 | Hall | .................................. 198/781.06 |
| 5,388,682 | * 2/1995 | Dudley | ................................. 198/367 |
| 5,423,418 | * 6/1995 | Furrow | .............................. 198/860.3 |
| 5,582,286 | * 12/1996 | Kalm et al. | ..................... 198/781.06 |
| 5,862,907 | * 1/1999 | Taylor | .............................. 198/781.06 |
| 6,021,888 | * 2/2000 | Itoh et al. | ........................ 198/781.06 |

OTHER PUBLICATIONS

*Itoh Power Moller*, Somfy Systems,Inc 1'93, Brochure.*
*Interroll, The Driving Force, Introducing Interlliveyor*, Interroll Corp., Brochure.*
*Interroll Meca*, Interroll Corp., Brochure.*

* cited by examiner

*Primary Examiner*—Joseph E. Valenza
(74) *Attorney, Agent, or Firm*—Philip G. Meyers; Philip G. Meyers Intellectual Property Law, P.C

(57) ABSTRACT

A modular power roller conveyor is described having a conveyor section for transporting a product unit. The conveyor section comprises a number of active zones, each active zone containing means for sensing the entry of a product unit into the active zone. A programmable controller generates activation signals to a drive roller in response to the means for sensing. A plurality of carrier rollers are slaved to the drive roller within the active zone such that activation of the drive roller actuates all of the carrier rollers to drive the product unit through the active zone and into the next active zone. The programmable controller also generates a deactuation signal to deactivate the active zone as a product unit exits the zone.

19 Claims, 10 Drawing Sheets

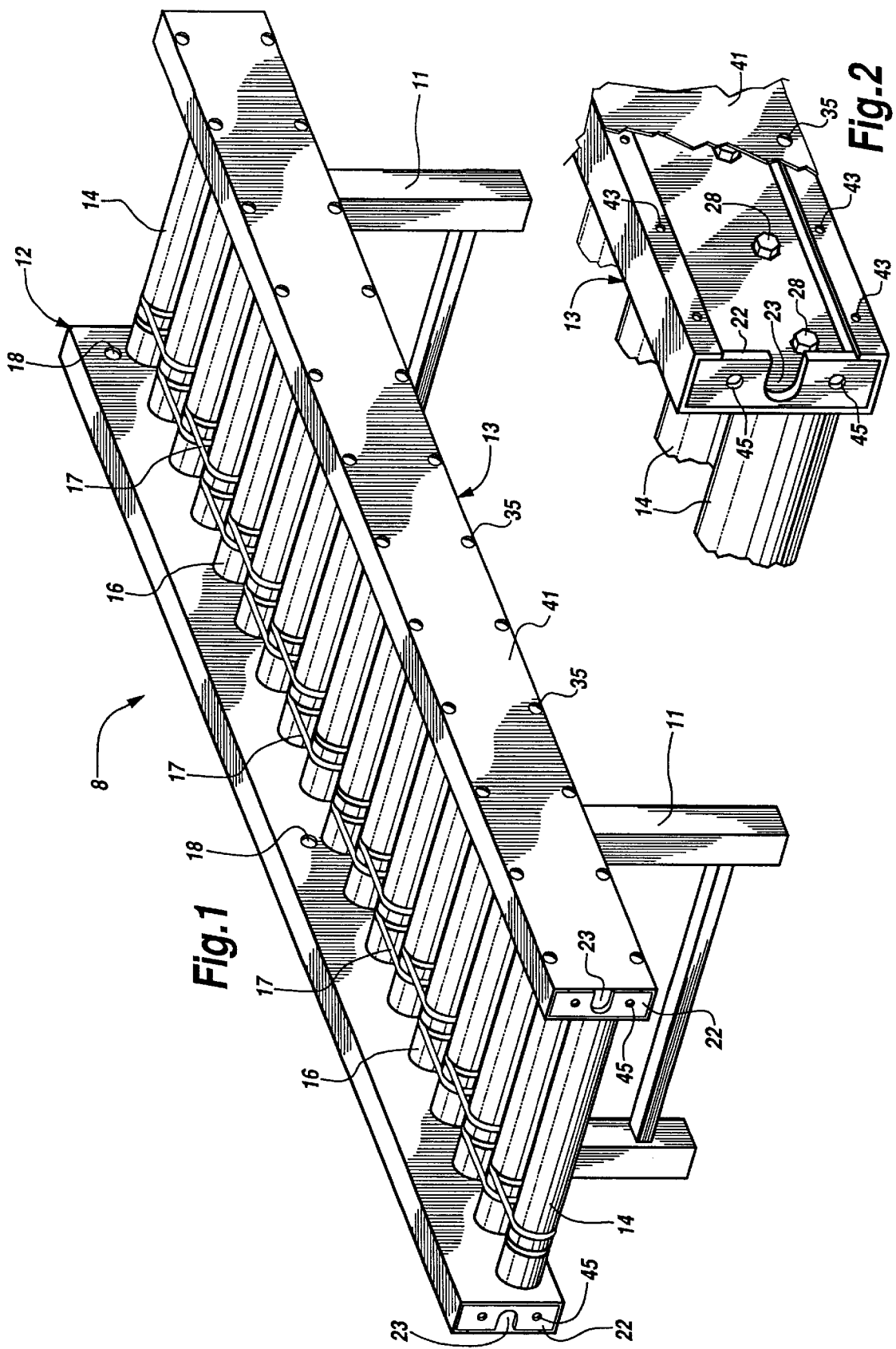

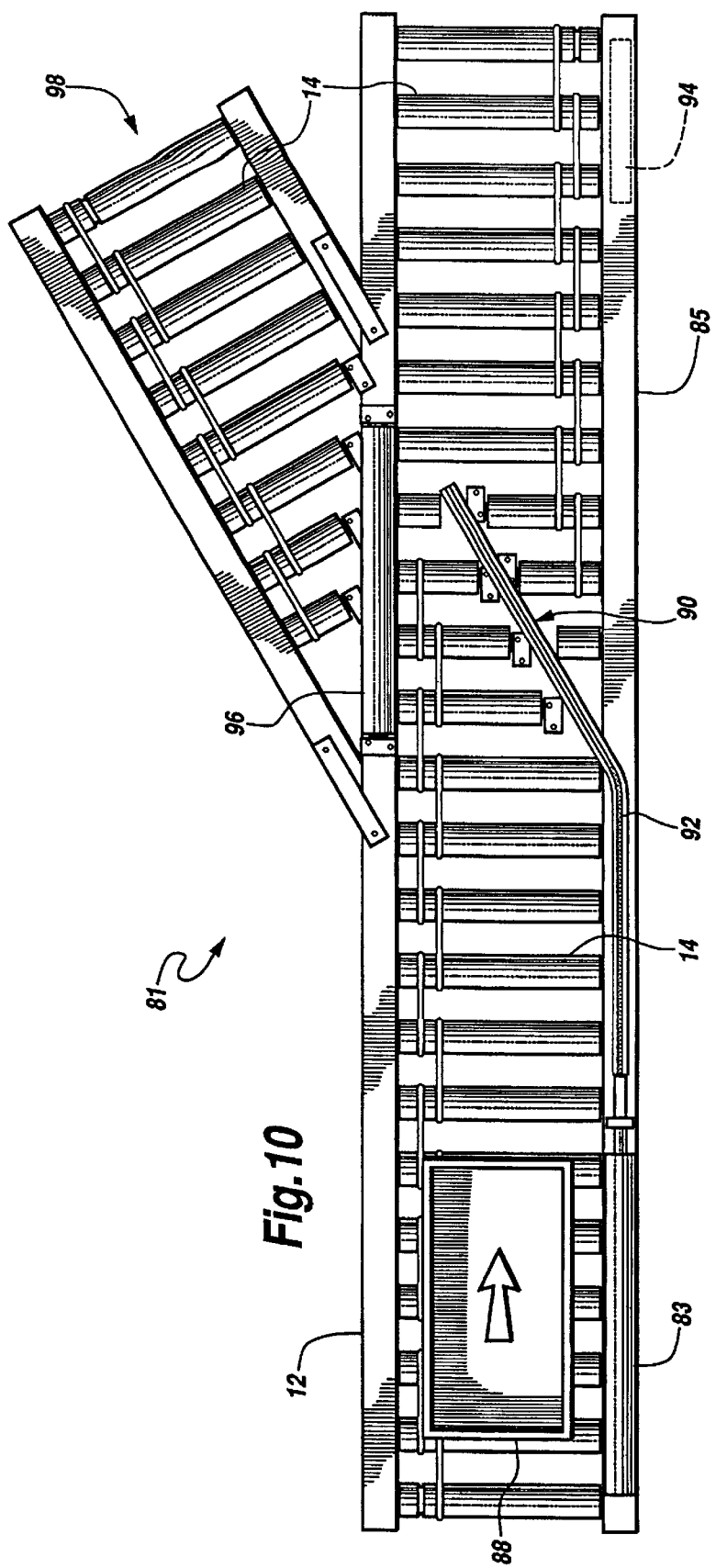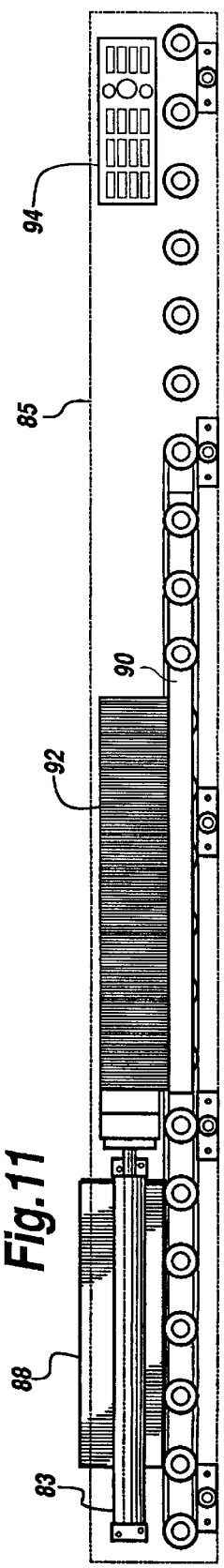

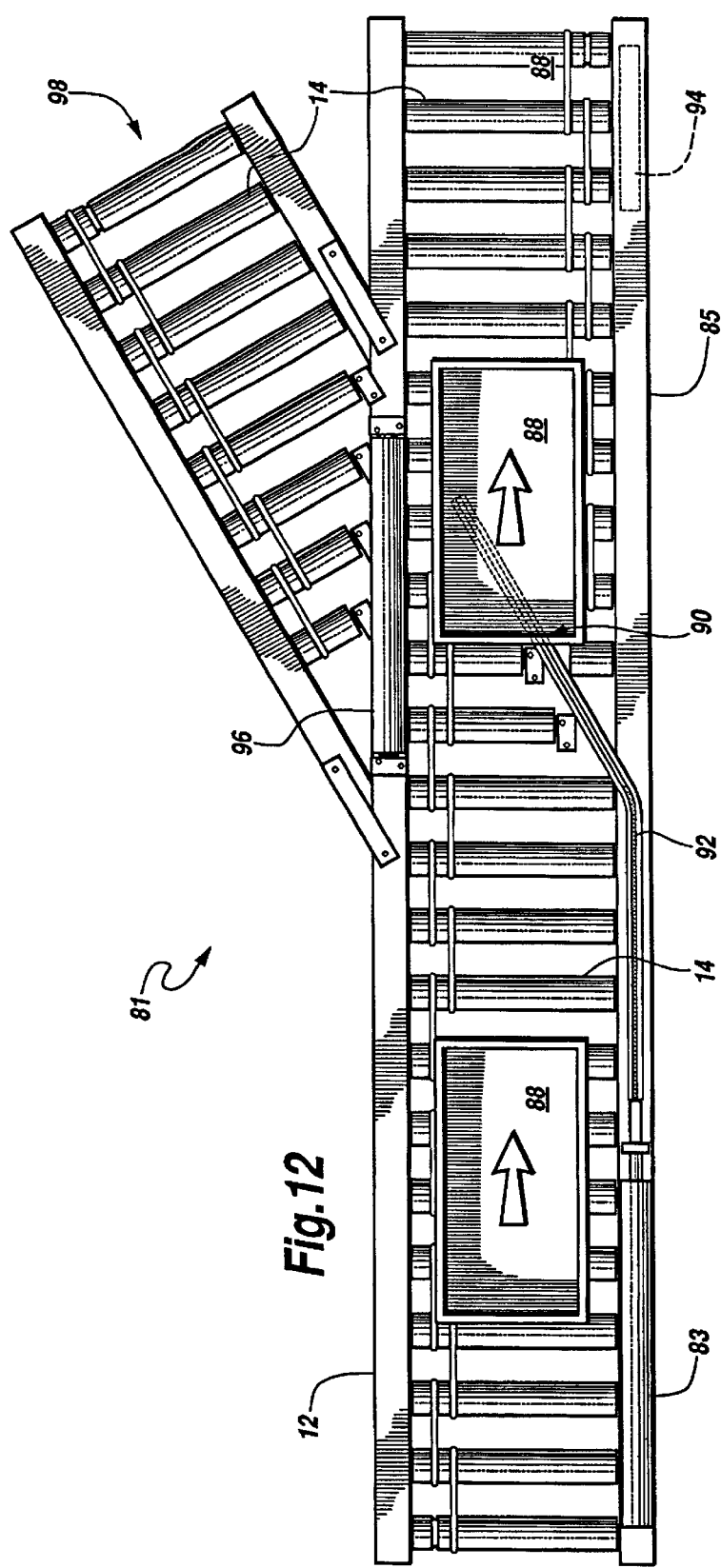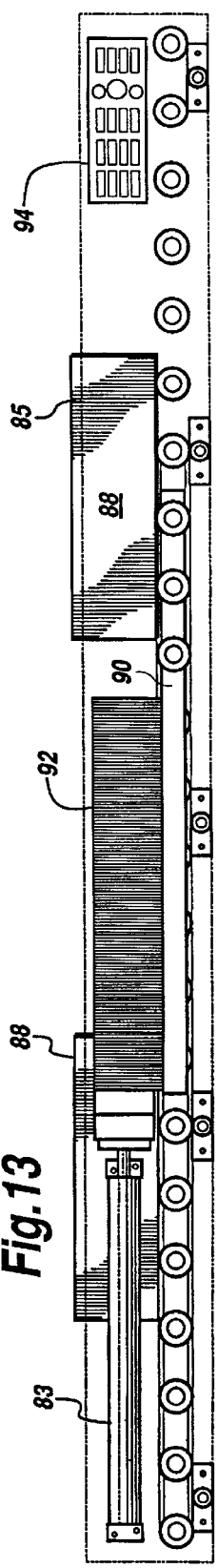
Fig.12
Fig.13

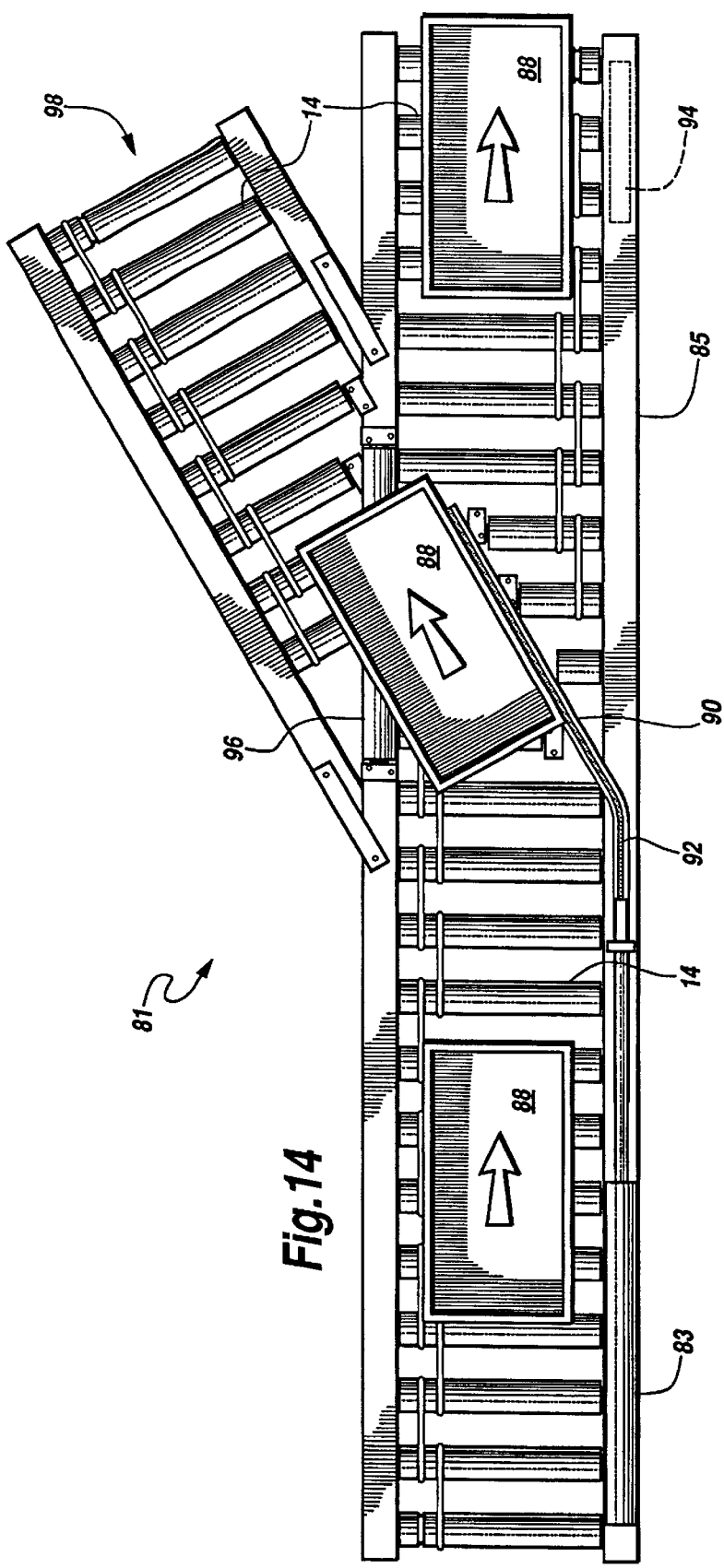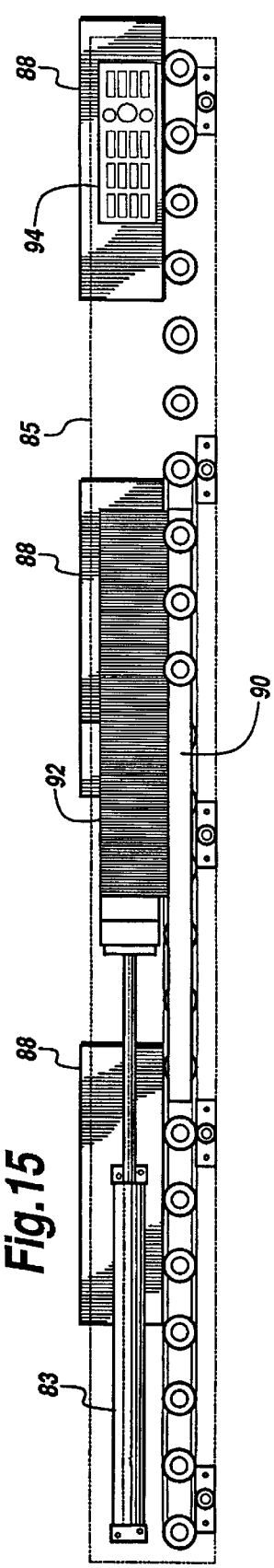

MODULAR POWER ROLLER CONVEYOR

This application is a continuation of prior application Ser. No. 08/331,063, filed on Oct. 28, 1994, U.S. Pat. No. 5,582,286, entitled MODULAR POWER ROLLER CONVEYOR.

TECHNICAL FIELD

The present invention relates to a conveyor systems and more particularly to a modular conveyor system and a method for conveyor operation.

BACKGROUND OF THE INVENTION

The movement of large numbers of product units, such as a tray or pallet, around a manufacturing or processing facility has long proved to be an expensive and time consuming task. Presently, most systems for carrying out the movement of product units around a manufacturing facility utilize static systems that are set up to maintain and transport product units using a particular configuration that is not easily changed. The problem with these type of systems is that manufacturing or processing requirements may change and reconfiguration of the static system is not easily achieved. Thus, weeks or even months may be required to reconfigure a conveyor system to meet the changing needs of the facility.

Prior art conveyor systems have many problems relating to the maintenance and complexity of the systems. One problem with existing conveyor systems is that the systems normally have complex mechanical gearing consisting of a large number of components. This type of mechanically geared conveyor system requires a great deal of maintenance in order to keep the system in peak operating condition. Air pressure operated systems require a complex pneumatic system in order to operate the conveyor. Pneumatic systems require labor intensive maintenance procedures in order to achieve peak operating conditions of the system. Existin, systems also create a great deal of noise when operating. Mechanically geared systems normally comprise a large number of chain and roller drive assemblies creating mechanical noise during operation. Pneumatic systems necessarily require the use of noisy compressors and air injection procedures which add to the noise pollution of the work environment. Finally, each of the above described systems require a great deal of power to operate since the entire system must function at the same time, no matter how many or few product units are present upon the conveyor system at any particular time.

Therefore, a conveyor system is needed which will allow a manufacturing or processing facility to quickly and easily reconfigure the system to changing facility needs, provide easy maintenance requirements, decrease the amount of noise pollution to the work environment, and provide lower energy consumption than is possible with presently existing systems.

SUMMARY OF THE INVENTION

The present invention overcomes the foregoing and other problems with a modular power roller conveyor system and onboard PLC/power card. The system consists of modular units having a frame for holding a plurality of carrier and drive rollers. These modular units are easily connected to form an adaptable conveyor system. The conveyor section of each module is divided into a number of active zones. Each active zone contains a photosensor and reflector pair for detecting the entry of a product unit into the active zone, a drive roller for driving rollers within the active zone, and a plurality of carrier rollers actuated in response to movement of the drive roller. Each zone is connected to a PLC/power card. Upon detection of a product unit by a photosensor, a control unit generates an activation signal to the drive roller of the active zone the product unit is entering. The drive roller drives the carrier rollers within the active zone allowing the product unit to be transported through the active zone and into the next active zone. At the same time, the controller generates a deactivation signal to the drive roller of the active zone the product unit is exiting to conserve system power.

BRIEF DESCRIPTION OF THE DRAWINGS

FIG. 1 is a perspective view of one section of the modular power roller conveyor of the present invention;

FIG. 2 is a cut-away representation of one side rail and several rollers of the section of FIG. 1 and the internal connecting brackets;

FIG. 10 is a top-view of a left-hand divert section of the power roller module;

FIG. 11 is a lateral view of a left-hand divert section of FIG. 10 of the power roller module;

FIG. 12 is a top view of the divert section of FIG. 10 illustrating the divert arm in an unactuated first position inside a hollow side rail;

FIG. 13 is a lateral view of the divert section of FIG. 12;

FIG. 14 is a top view of a divert section of FIG. 1 illustrating the divert arm in an actuated second position extending from the hollow side rail across the conveyor and diverting a product unit from a first path to a second path;

FIG. 15 is a lateral view of a divert section of FIG. 14;

DETAILED DESCRIPTION

Figure 3:
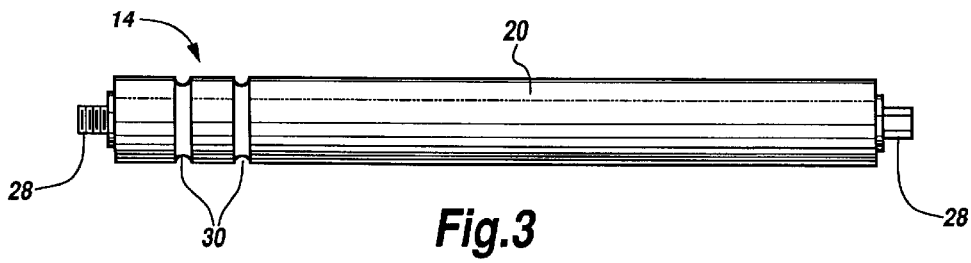
FIG. 3 is a side view of one of the carrier rollers.

Referring now to the Drawings, and more particularly to FIG. 1, there is illustrated a perspective view of one embodiment of a module 8 for the modular power roller conveyor of the present invention. The module 8 is a straight conveyor section 10 for transporting received product units. The straight conveyor section 10 is supported by legs 11 and consists of a left side rail 12, a right side rail 13, a plurality of carrier rollers 14 and drive rollers 16 mounted between the left side rail 12 and the right side rail 13. The drive rollers and the carrier rollers may be of the type manufactured by Interroll Corporation and identified as model Driverroll. The carrier rollers 14 and drive rollers 16 are interconnected by a plurality of O-ring bands 17 such that actuation of a drive roller will cause actuation of any carrier rollers connected thereto.

The side rails 12 and 13 have a cross-sectional shape that defines an interior chamber for placement of a controller (FIG. 16) and control wiring (not shown).

Openings 18 within side rails 12 and 13 facilitate operation of a plurality of photosensors 34 and reflectors 36 (FIG. 4) for sensing the presence of product units or the straight conveyor section 10. Mounted to the side rails 12 and 13 at each end of the straight conveyor section 10 are internal connecting brackets 22 with holes 45 for bolts and nuts to enable the straight conveyor section 10 to be interconnected with another module 8 and form a conveyor system. An electrical connector mounted in an opening 23 enables a module 8 to be electrically connected to other modules or to a power supply.

Referring now to FIG. 2, there is shown a cut-away representation of the side rail 13 and several rollers 14 and the internal connecting bracket 22. Holes 45 in the connecting bracket 22 allow structural connection with an adjoining module 8, while an opening 23 in the internal connecting bracket 22 allows wire connection between electronic components of adjacent modules 8. A cover 41 protects the wireway, and is connected to side rail 13 with single-turn screws 35 and rifled holes 43. The shafts on which the rollers 14 and 16 turn are spring loaded at one end 28, and the spring loaded end passes through holes in the side rail 13.

Figure 4:
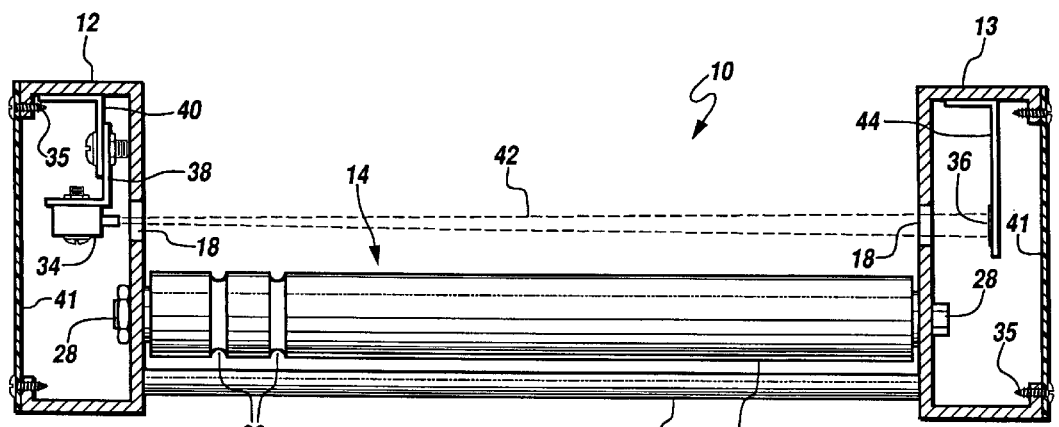
FIG. 4 is a lateral cross-section view of the conveyor section of FIG. 1.

Referring now to FIG. 3 and FIG. 4, there is shown a side view of one of a carrier roller 14. The carrier roller surface 20 is preferably fabricated from a galvanized steel tube. The shafts 28 of the carrier roller 14 are spring loaded at each end allowing for easy removal and mounting of the carrier roller within the side rails 12 and 13. Each carrier roller 14 also includes a pair of grooved channels 30 for placement of the O-ring bands 17 (FIG. 1) between adjacent carrier rollers. Each drive roller 16 has an outward appearance similar to that of the carrier rollers 14. The drive roller 16 has a roller surface 26, spring loaded shaft 28 on one side and a lock nut and a full nut on the opposite side, and groove channels 30. However, the drive rollers 16 further include internal gearing and an electric motor. The drive rollers 16 are preferably twenty-four volt electric conveyor rollers manufactured by the Interroll Corporation.

Referring to FIG. 4, there is shown a lateral cross-section view of the conveyor section 10 more fully illustrating the placement and operation of the photosensors 34 and reflectors 36 mounted along the conveyor section 10. The photosensor 34 is mounted to a lower sensor bracket 38. Lower sensor bracket 38 connects to an upper sensor bracket 40 which connects to the upper surface of left side rail 12. The assembly is positioned in such a manner that a beam 42 from photosensor 34 is passes through opening 18 within left side rail 12. The beam 42 passes laterally across the conveyor section 10 and passes through opening 18 in the right side rail 13 to strike reflector 36 and is reflected back to sensor 34 where the reflected beam is detected. The reflector 36 is mounted to the interior of the right side rail 13 by a reflector bracket 44.

Figure 5:
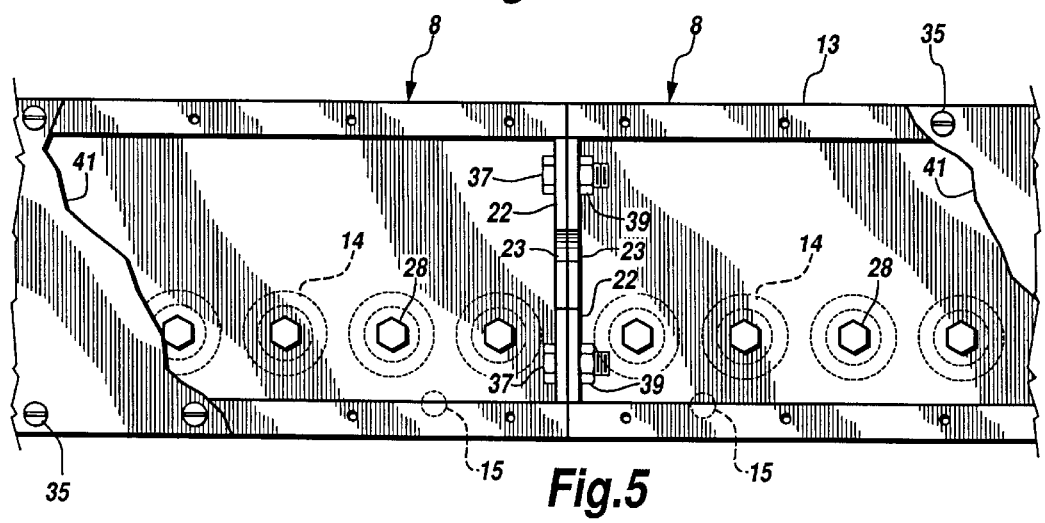
FIG. 5 is a lateral view of the interface between adjacent sections showing the attachment of the roller shafts to the side rail.

Referring to FIG. 5, there is shown a lateral view of the interface between adjacent modules with the bolts 28 attaching the shafts of rollers 14 to the side rail 13. A connecting bracket 22 is shown connecting adjacent modules 8 by means of bolts 37 and nuts 39. Electrical connection is made by means of connectors (not shown) mounted to openings 23. The cover 41 attached at several points 35.

Figure 6:
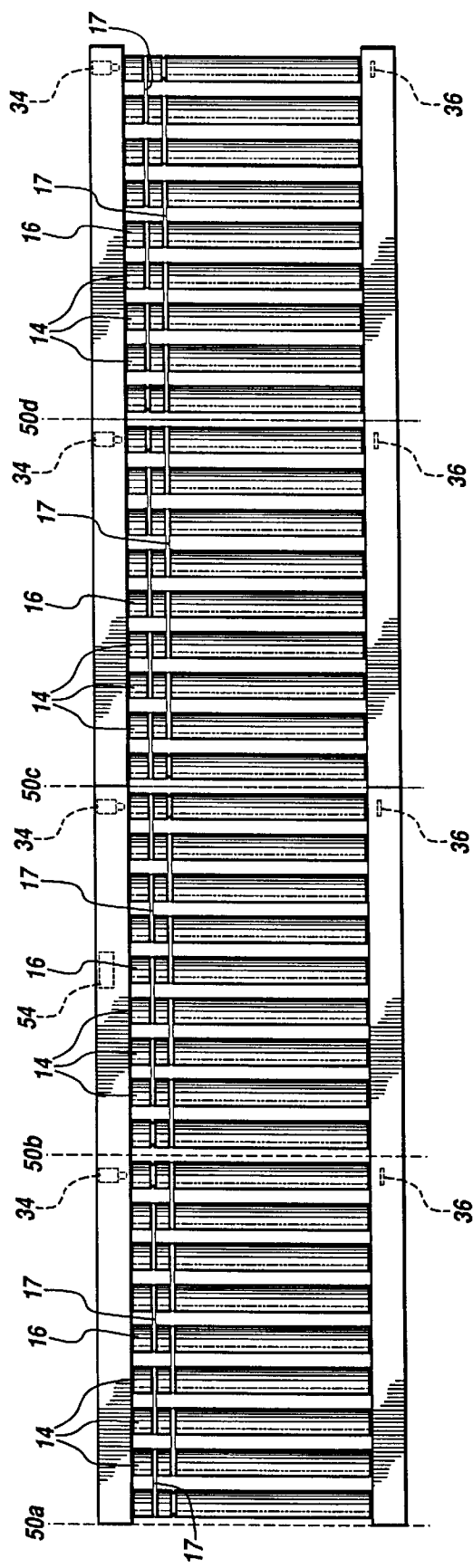
FIG. 6 is a top view of the straight conveyor section of FIG. 1 comprised of four active zone.

Referring now to FIG. 6, there is illustrated a top view of a straight conveyor section including four active zone areas 50a–50d. Each active zone includes a drive roller 16 and plurality of carrier rollers 14 slaved to the drive roller by O-ring bands 17. Also included within each active zone 50 is a photosensor 34 and a reflector 36 located prior to the entry end 52 of the active zone. A programmable controller 54 (FIG. 16) is mounted in the left side rail 12 and is in communication with each drive roller 16, the plurality of photosensors 34 and programmable controllers (FIG. 16) in adjacent conveyor sections.

As a product unit leaves one active zone 50a, the product unit breaks the light beam 42 (FIG. 4) between photosensor 34 and reflector 36. This causes a detection signal to be transmitted to the controller 54 (FIG. 16) by the photosensor 34. For example, upon receipt of a detection signal from the active zone 50b, the controller 54 (FIG. 16) generates an activation signal to the drive roller 16 of the active zone 50b as the product unit is entering the zone. Activation of the drive roller 16 initiates movement of the drive roller and all slaved carrier rollers 14. At the same time, a deactivation signal is transmitted to the drive roller 16 of the active zone 50a as the product unit is exiting this zone. This process continues as the product unit passes from one active zone 50 to another. It is important to note that the drive roller 16 of an active zone 50 is only activated while a product unit moves through the active zone. When a product unit leaves an active zone 50 and no other product units enter the active zone, the drive roller 16 and slaved carrier rollers 14 are not actuated. This results in a conveyor system that uses less power and produces less noise than presently existing systems.

Figure 7:
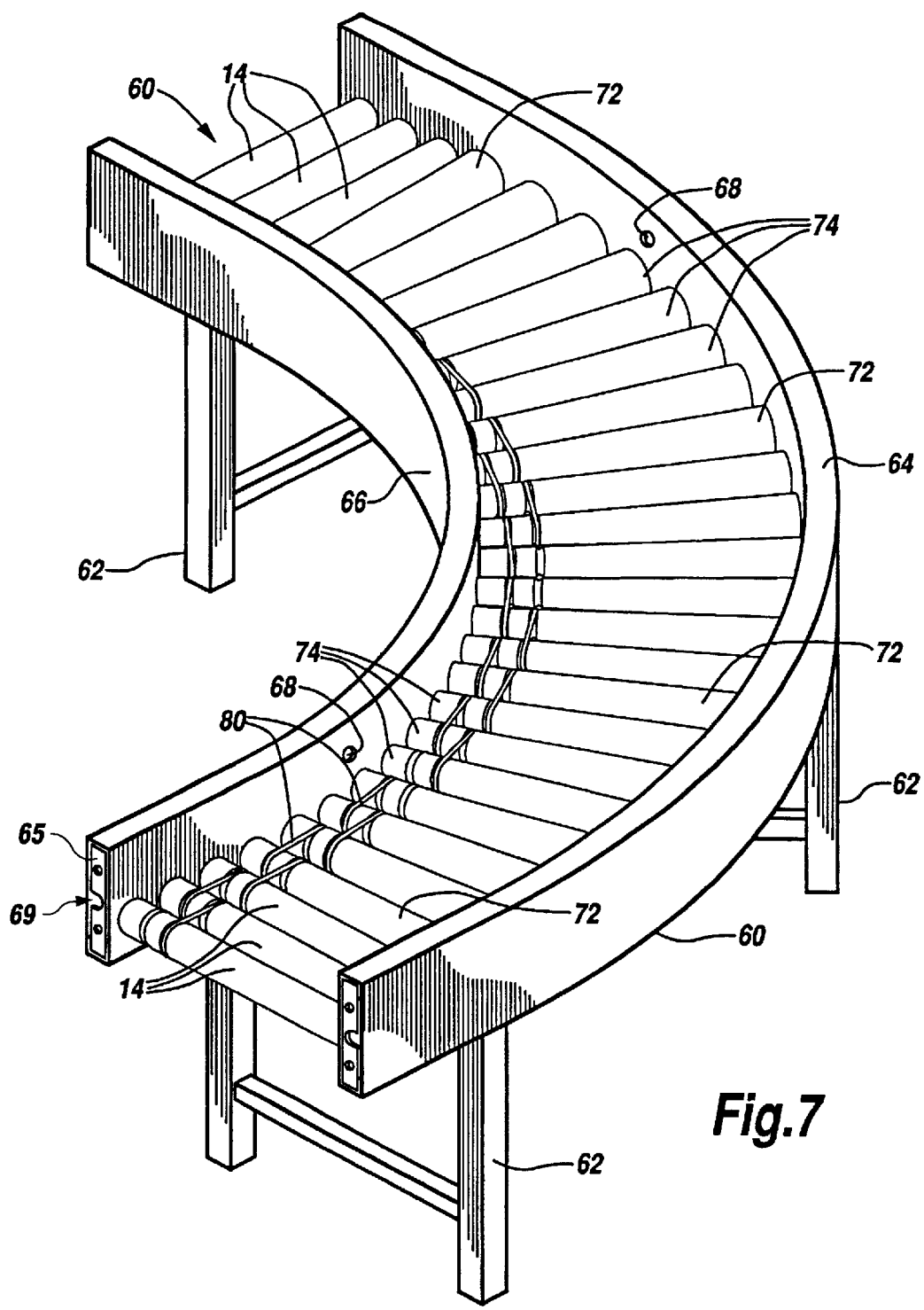
FIG. 7 is a perspective view of a curved conveyor section of the modular power roller conveyor of the present invention.

Referring now to FIG. 7, there is shown curved section of the modular power roller conveyor of the present invention. The module of FIG. 7 comprises a curved conveyor section 60 that change the direction of travel of a product unit by 90°. It is important to note that while this particular module illustrates a 90° turn, a turn from anywhere between 0° and 180° may be constructed. The curved conveyor section 60 is supported by legs 62. As before, the curved conveyor section 60 comprises a left side rail 64, a right side rail 66, drive rollers 72 and carrier rollers (14, 74) mounted between the left side rail 64 and the right side rail 66. The carrier rollers 74 are connected to the drive roller 72 by a plurality of O-ring bands 80 such that actuation of a drive roller will actuate any carrier rollers connected thereto.

Openings 68 within side rails 64 and 66 facilitate operation of photosensors 34 (FIG. 4) and reflectors 36 (FIG. 4). The photosensor and reflector assemblies are mounted in a manner similar to that discussed with respect to FIG. 3. At each end of the curved conveyor section 60 connecting brackets 65 are mounted to the left and right side rails 62 and 64 to interconnect the curved conveyor section 60 to other conveyor sections. Each end of the curved conveyor section 60 also includes a electrical connector mounted in an opening 69 for electrical connection between adjacent modules or a power supply.

Figure 8:
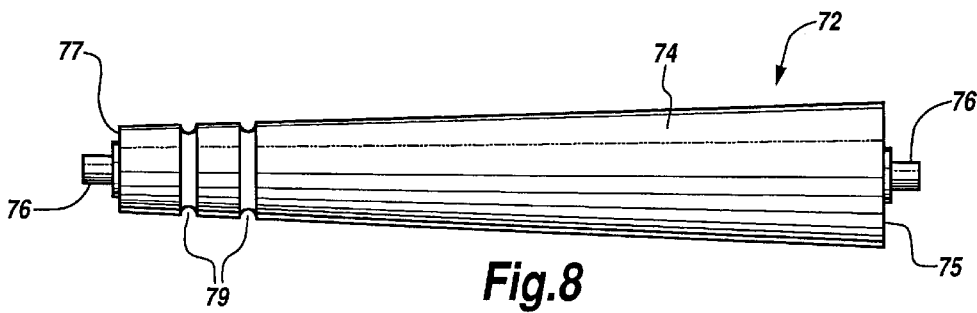
FIG. 8 is a tapered roller of the curved conveyor section of FIG. 7.

Referring now to FIG. 8, there is illustrated the tapered carrier roller 72 of the curved conveyor section 60. The carrier rollers 14 on the straight portions of the curved conveyor section 60 are the same as those discussed with respect to FIG. 3. On the tapered carrier roller 72, the carrier roller surface is preferably fabricated from galvanized steel tubing overlain with high impact molded copolymer segments. The surface forms a continuous taper from a large diameter end 75 to a small diameter end 77 to allow efficient movement of a product unit around the curved section. Spring loaded shafts 76 allow for mounting and removal of the tapered carrier roller 72 within the left and right side frames 64 and 66. The tapered carrier rollers 72 are mounted such that the small diameter end 77 is placed upon the interior radius of the curved conveyor section 60. Grooved channels 79 allow for placement of O-ring bands 80 (FIG. 7) between adjacent rollers. Drive rollers 72 have a similar appearance to the carrier rollers and are preferably twenty-four volt electric conveyor rollers as manufactured by the Interroll Corporation.

Figure 9:
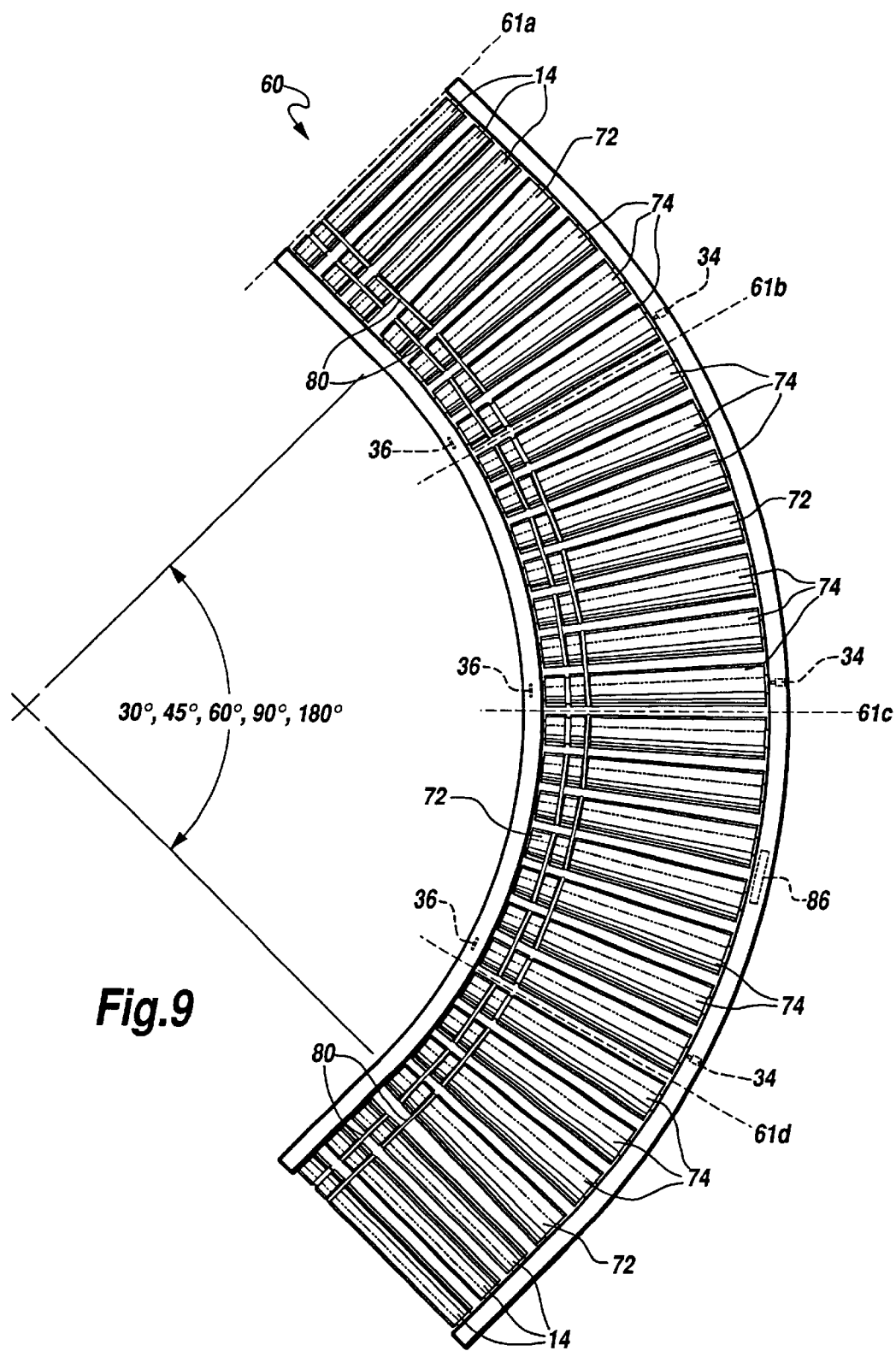
FIG. 9 is a top view of the curved conveyor section of FIG. 7.
Figure 16:
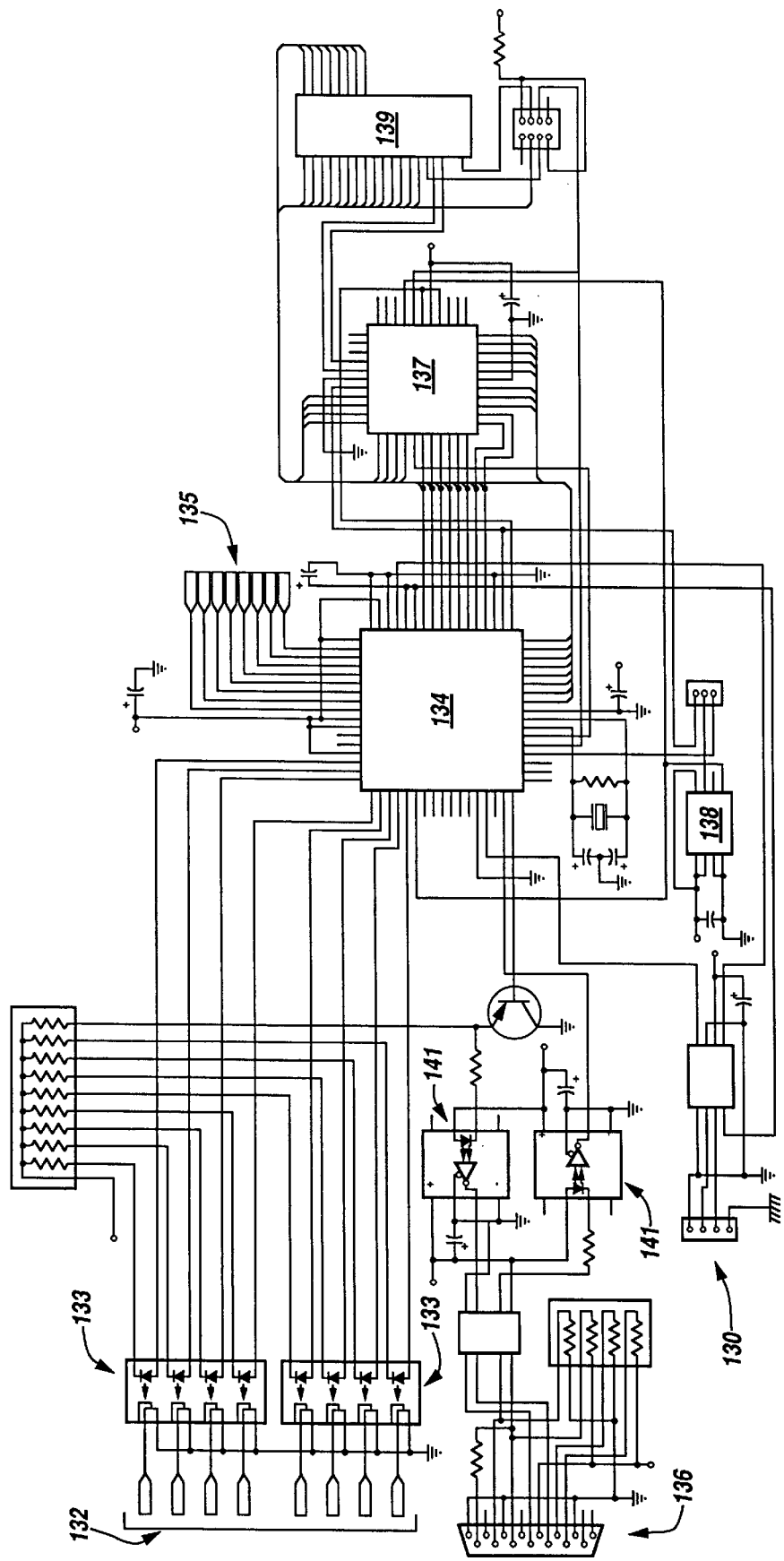
FIG. 16 is a circuit wiring diagram of the controller.

Referring to FIG. 9, there is illustrated a top view of the curved conveyor section 60 of the curved section module. The conveyor section 60 comprises a number of active zones 61a–61d. As a product unit passes between a photosensor 34 and reflector 36 and into an active zone 61b, the photosensor 34 transmits a detection signal to a controller 86 (FIG. 16). In response to the detection signal, the programmable controller 86 (FIG. 16) generates an activation signal to the drive roller 72 of the active zone 61b. The drive roller 72 drives each of the slaved carrier rollers 74 within the active zone 61b until the product unit passes to the active zone 61c. The detection signal also causes the controller 86 (FIG. 16) to generate a deactivation signal to the drive roller 72 of the active zone 61a as the product unit is exiting this zone.

Referring to FIG. 10 and FIG. 11, there is illustrated a top-view and a side view of a left-hand divert section 81 of a power roller conveyor. A flexible divert arm 92 is mounted to a side rail 85. A programmable controller 94 (FIG. 16) actuates an air cylinder 83 mounted to the side rail 85 and the extension of the plunger arm within the cylinder 83 extends the flexible divert arm 92 from the side rail 85 across the divert section 81. A track 90 in the plane defined by the surface of the rollers, comprises a narrow groove that serves as a guide for the flexible divert arm 92. The track extends obliquely from the side rail 85, to the limit of extension of the flexible divert arm 92. When the cylinder 83 is actuated, the divert arm 92 slides along the side rail 85 and along the track 90, into the path of product units 88 moving along the conveyor. The bottom edge of the divert arm 92 lies within the groove of the track 90 and as product units pass along the conveyor 81 the divert arm 92 is encountered and slides along the divert arm. Positioned at an angle with reference to the divert section 81 is a straight section 98, and product units that encounter the divert arm 92 slide along the divert arm into the straight section 98 of power roller conveyor.

In a left-hand divert as shown in FIG. 10 the divert arm extends from the side rail 85, but right-hand divert sections are also available, in which the divert arm 92 extends from the opposite side rail. Also available are dual divert sections in which a divert arm 92 extends from each side rail, and a track 90 extends from each side rail, so that product unit may be diverted to the left, to the right, or move straight ahead according to instructions from the programmable controller 94 (FIG. 16).

An alternative embodiment of the invention includes a right angle transfer arm that moves up from below the surface defined by the rollers. The right angle transfer arm is raised by instruction from the programmable controller 94 (FIG. 16).

Referring now to FIG. 12 (a top view), and FIG. 13 (a lateral view), of the divert section 81 in which the divert arm 92 is unactuated and remains positioned along the side rail 85. A product unit 88 passing along the conveyor continues in a straight line, as though the section were a straight modular section.

Referring now to FIG. 14 (a top view), and FIG. 15 (a lateral view), of the divert section 81 the divert arm 92 is actuated and extends from the side rail 85 into the path of the product unit 88 moving along the conveyor. The product unit is diverted into the side path 98.

Figure 17:
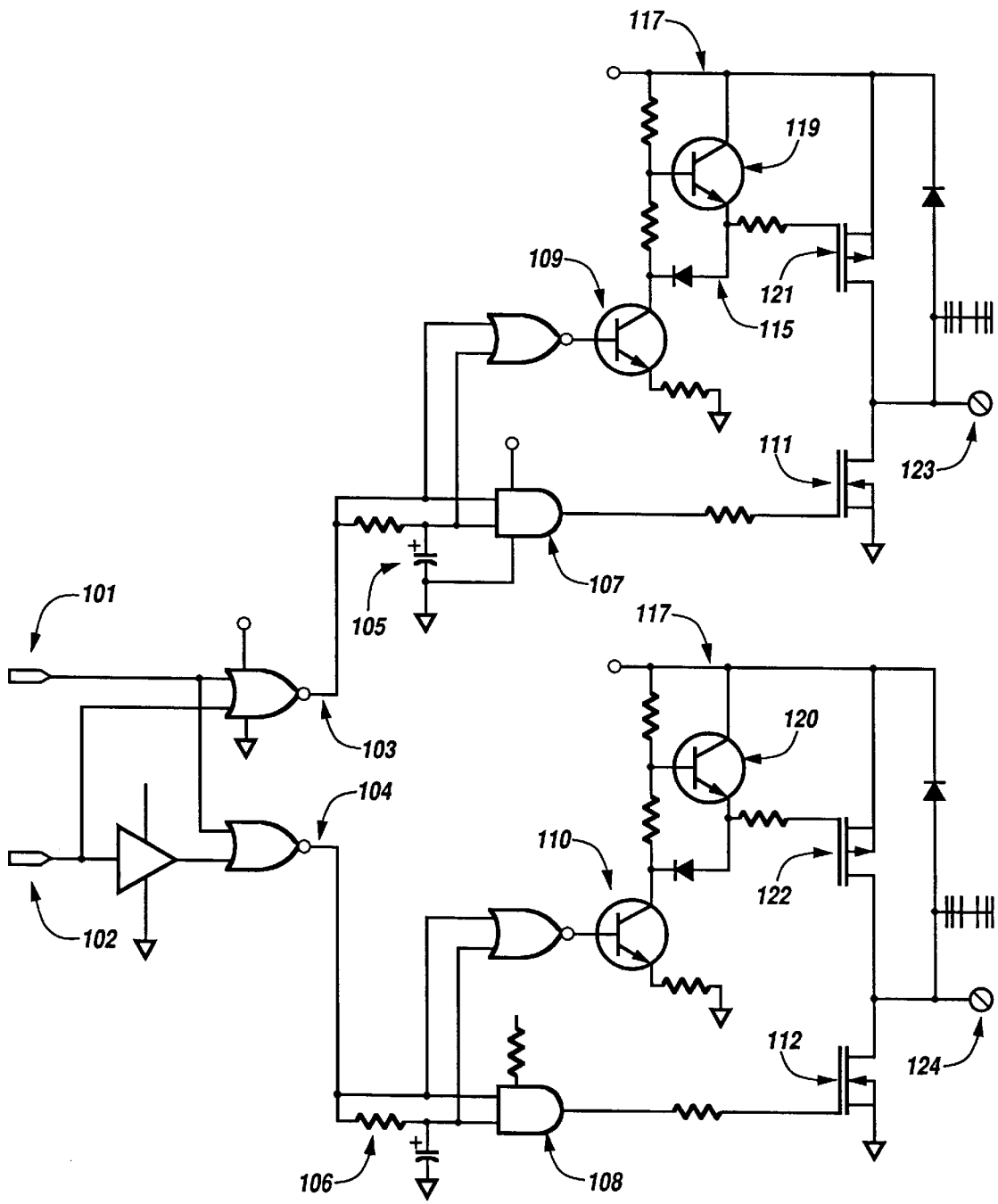
FIG. 17 is a schematic of a logic circuit within the controller.

Referring now to FIG. 16, there is shown a schematic of a preferred implementation of the controller. One such controller appears on each conveyor module. A FLASH-RAM 139 (manufacture designation AT29C256) stores ladder logic code as the computer program for the module. A logic network 137, for example a PSD311 44-pin chip, includes internal logic to interface with a microprocessor 134. The logic network 137 contains a SRAM interconnected to the microprocessor 134; an EPROM; and other logic and switching circuits. The microprocessor 134 controls circuitry associated with the module. A logic network 138, for example a DS1232, restarts the microprocessor 134 in the event of microprocessor interruption. Two logic networks 141, for example HCPL-2400 chips, serve as optical isolators for a serial port, protecting the microprocessor 134 from voltage surges. A networking interface connects a transorb 136 to the microprocessor 134. The transorb 136 clips any voltage above 12 volts, sending it to ground. A high-speed one-meg serial port 130 allows the microprocessor 134 to communicate with the logic networks 141 of an interconnected module. A port 140 allows modification and installation of logic code into the FLASH-RAM 139 by a system installer when the site is initially configured. The inputs of four circuits of the type generally shown in FIG. 17 are collectively made available through terminals 132 to the microprocessor 134. One controller of the type generally shown in FIG. 16 is mounted on each module, as described above, and measures 8"×6"×2". Eight digital inputs at terminals 132 connect to the input pins of the microprocessor 134 through light emitting diodes (LED's) 133 connected to the input terminals 132, these terminals also allow controller diagnostics. Sensor signals at terminals 135 from each of several photosensors also serve as inputs to the microprocessor 134. In the preferred embodiment, the controller operates from a 24 volt AC source, and the interconnected controllers of various modules operate in DEVICE NET and SDS. The controllers communicate on DEVICE NET or on SDS application layers.

Referring now to FIG. 17, there is illustrated a schematic of a logic circuit allowing the controller to alter direction of motion of items on the module, and to enable dynamic braking. Four circuits functionally equivalent to the circuit shown in FIG. 17 reside on each module. One input 101 controls dynamic braking; when the value of the input 101 is zero, dynamic braking is engaged, and the motor driving all rollers associated with the module are stopped. The input 101 is applied to the input to each of two NOR gates 103 and 104, forcing the outputs of the NOR gates 103 and 104 to zero whenever input 101 has a value of one. The output of the NOR gates 103 and 104 passes through a resistor-capacitor debouncer 105 or 106 and through an AND gate isolator 107 or 108, and finally through a resistor, to a JFET 111 or 112. Thus, when input 101 has a value of one, the output of the NOR gates 103 and 104 is zero and the JFETs 111 and 112 close, driving the outputs 123 and 124 to ground. This prevents power from reaching the outputs 123 or 124. On the other hand, when input 101 is zero, the outputs are enabled.

The inverter associated with input 102 ensures that one and only one of the two initial NOR gates 103 or 104 will carry a double-zero input, allowing an output 103 or 104 of the NOR gates to be zero. Thus, input 102 selects which portion of the circuit to energize. This zero value will be passed through the debouncer 105 or 106 and the AND gate 107 or 108, keeping the JFET 111 or 112 open; the output 123 or 124 will not be grounded. The "zero" output from the initial NOR gate 103 or 104 is inverted to a "one" as it passes through the final NOR gate 109 or 110, providing a non-zero signal that is amplified by the cascaded transistors 109, 119, 110 and 120 to a rail voltage 117 of 30 volts. The high voltage closes the output JFET 121 or 122 and connects the output 123 or 124 to the 30-volt rail voltage 117, powering a motor. Input 102 controls the direction of the rollers; the top half of FIG. 17, if energized, drive the motor in one direction, and the bottom half drives the motor in the other direction, as controlled by an inverter; only one portion of the circuit will operate at any given time. The circuit as shown in FIG. 17 shows only two inputs, but because four such circuits appear on any given module, eight inputs are supplied to the microprocessor (shown in FIG. 16).

Although preferred and alternative embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. A modular conveyor system, comprising a series of separate conveyor sections connected end-to-end for transporting a product unit from one conveyor section to another, wherein each conveyor section comprises:

a support frame;

a series of at least two, first and second active conveyor zones each including a conveyor mechanism mounted on the frame, wherein the active zones define a path for movement of a product unit along the path from the first zone to the second zone, from one end of the conveyor section to the other, and from a zone of one conveyor section to a zone of an adjoining section;

a sensor for each zone of each conveyor section, which sensors are positioned to sense entry of a product unit into the respective active zone and generate a detection signal in response thereto; and a programmable controller, including a memory for storing program code, a microprocessor for execution of the program code, sensor signal inputs coupled to the microprocessor for receiving sensor signals from each sensor of the associated conveyor section, control circuits coupled to the microprocessor which permit the microprocessor to individually control the conveyor mechanism of each active zone of the associated conveyor section, and a communications interface whereby the programmable controller of each section is connected to and communicates with the programmable controller of an adjacent section in order to pass the product unit from one conveyor section to another.

2. The system of claim 1, wherein the communications interface comprises a serial port.

3. The system of claim 1, wherein the programmable controller further comprises a port coupled to the memory for uploading program code thereto.

4. The system of claim 1, wherein the conveyor mechanism of each active zone comprises a drive roller controlled by the associated control circuit, a plurality of carrier rollers, and means for interconnecting the carrier rollers for rotation in unison with the drive roller.

5. The system of claim 4, wherein each control circuit operates the drive roller to stop or rotate in either forward or reverse directions.

6. The system of claim 1, wherein the sensors comprise photosensors positioned proximate each associated active zone at spaced positions along each conveyor section.

7. The system of claim 4, wherein the support frame comprises legs supporting a pair of side rails between which the drive rollers and carrier rollers are mounted.

8. The system of claim 1, wherein each conveyor section further comprises wiring for connecting the programmable controllers of the sections in series.

9. The system of claim 8, wherein the frame further comprises end flanges at opposite ends thereof, means for securing an end flange of one section to the end flange of an adjacent section to connect the conveyor sections end-to-end, and a connector for interconnecting the wiring of one section to the wiring of an adjacent section.

10. The system of claim 1, wherein the programmable controller further comprises light emitting diodes coupled to the microprocessor intermediate the microprocessor and each of the control circuits.

11. A modular conveyor system, comprising a series of separate conveyor sections connected end-to-end for transporting a product unit from one conveyor section to another, wherein each conveyor section comprises:

a support frame including legs supporting a pair of side rails;

a series of at least two, first and second active conveyor zones each including a conveyor mechanism mounted on the frame, each conveyor mechanism including a drive roller and a plurality of carrier rollers, the drive rollers and carrier rollers being mounted between the side rails of the frame, and means for interconnecting the carrier rollers for rotation in unison with the drive roller, wherein the active zones define a path for movement of a product unit along the path from the first zone to the second zone, from one end of the conveyor section to the other, and from a zone of one conveyor section to a zone of an adjoining section;

a photosensor for each zone of each conveyor section positioned proximate each associated active zone at spaced positions along each conveyor section, which photosensors are positioned to sense entry of a product unit into the respective active zone and generate a detection signal in response thereto; and a programmable controller, including a memory for storing program code, a microprocessor for execution of the program code, sensor signal inputs coupled to the microprocessor for receiving sensor signals from each sensor of the associated conveyor section, control logic circuits coupled to the microprocessor which permit the microprocessor to individually control the conveyor mechanism of each active zone, a communications interface whereby the programmable controller of each section is connected to and communicates with the programmable controller of an adjacent section in order to pass the product unit from one conveyor section to another; and wiring for connecting the programmable controllers of the sections in series.

12. A modular conveyor section for forming a conveyor system wherein a series of the conveyor sections are connected end-to-end, comprising:

a support frame;

a series of at least two, first and second active conveyor zones each including a conveyor mechanism mounted on the frame, wherein the active zones define a path for movement of a product unit along the path from the first zone to the second zone, and from one end of the conveyor section to the other;

a sensor for each zone of each conveyor section, which sensors are positioned to sense entry of a product unit into the respective active zone and generate a detection signal in response thereto; and a programmable controller, including a memory for storing program code, a microprocessor for execution of the program code, sensor signal inputs coupled to the microprocessor for receiving sensor signals from each sensor of the associated conveyor section, control circuits coupled to the microprocessor which permit the microprocessor to individually control the conveyor mechanism of each active zone of the associated conveyor section, and a communications interface whereby the programmable controller of each section is connected to and communicates with the programmable controller of an adjacent section in order to pass the product unit from one section to another.

13. The system of claim 12, wherein the communications interface comprises a serial port.

14. The system of claim 12, further comprising a port coupled to the memory for uploading program code thereto.

15. The system of claim 12, wherein the conveyor mechanism of each active zone comprises a drive roller controlled by the associated control circuit, a plurality of carrier rollers, and means for interconnecting the carrier rollers for rotation in unison with the drive roller.

16. The system of claim 12, further comprising wiring that connects the programmable controllers of the sections in series.

17. The system of claim 16, wherein the frame comprises legs supporting a pair of side rails and end flanges at opposite ends thereof, means for securing an end flange of one section to the end flange of an adjacent section to connect the conveyor sections end-to-end, and each section further comprises a connector for interconnecting the wiring of one section to the wiring of an adjacent section.

18. The system of claim 12, wherein the sensors comprise photosensors positioned proximate each associated active zone at spaced positions along each conveyor section.

19. The system of claim 15, wherein the frame comprises legs supporting a pair of side rails between which the drive rollers and carrier rollers are mounted.

* * * * *